United States Patent Office 2,946,763
Patented July 26, 1960

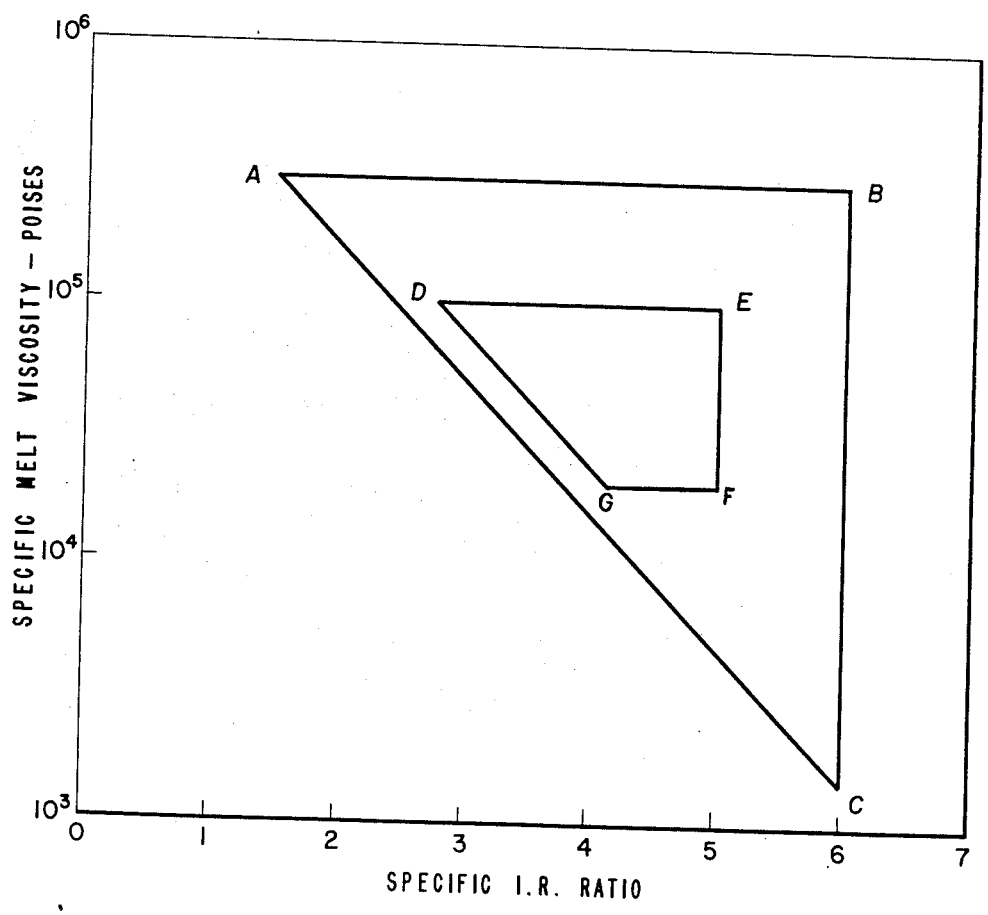

2,946,763

NOVEL PERFLUOROCARBON POLYMERS

Manville Isager Bro and Bernd Wilhelm Sandt, Wilmington, Del., assignors to E. I. du Pont de Nemours and Company, Wilmington, Del., a corporation of Delaware Filed Mar. 29, 1957, Ser. No. 649,451

13 Claims. (Cl. 260—45.5)

This invention relates to novel perfluorocarbon polymers, and more particularly to new and improved interpolymers of tetrafluoroethylene and hexafluoropropylene.

It is a general object of the present invention to provide usefully tough, stable, melt-extrudable perfluorocarbon polymers capable of being fabricated at practical rates into tough, homogeneous shaped articles via conventional techniques involving extruding the polymer in the molten state through a restricted orifice. In a more specific aspect, it is an object to provide interpolymers of hexafluoropropylene and tetrafluoroethylene which are capable of being fabricated at practical rates via melt extrusion into thin, tough, homogeneous, continuous shaped articles, such as film, filament, tubing, wire covering and the like. Other objects will be apparent hereinafter.

According to the present invention, the aforesaid objects are achieved by resins of interpolymeric hexafluoropropylene and tetrafluoroethylene having a specific melt viscosity of $1.5 \times 10^3$ to $3 \times 10^5$ poises, a specific I.R. ratio of from 1.5 to 6 which is at least equal to 12.26 minus (1.96 times the common logarithm of the specific melt viscosity), and a specific volatile content of less than 0.3 percent. The crystalline melting points of the resins of the present invention range from 242° C. to 305° C. and approximately equal 327 minus (14.1 times the specific I.R. ratio), in degrees C. Figure I is a plot of log specific melt viscosity vs. specific I.R. ratio of the interpolymers of the present invention, which fall within the limits of the triangle ABC.

In a preferred embodiment the resins of the present invention have a specific melt viscosity in the range of $3 \times 10^4$ to $1 \times 10^5$ poises, and in particularly preferred embodiments a specific I.R. ratio of from 2.77 to 5 which is at least equal to 12.585 minus (1.963 times the common logarithm of the specific melt viscosity), and a specific volatile content of less than 0.2 percent. These particularly preferred resins have crystalline melting points in the range of 256 to 287° C. They fall within the limits of the four sided figure, DEFG, of Figure I.

By the term "specific melt viscosity" as used herein, is meant the apparent melt viscosity as measured at 380° C. under a shear stress of 6.5 pounds per square inch. The values herein referred to are determined using a melt indexer of the type described in American Society of Testing Materials test D-1238-52T, modified for corrosion resistance to embody a cylinder and orifice of "Ampco" aluminum bronze and a piston weighing 10 grams, having a "Stellite" cobalt-chromium-tungsten alloy tip. The resin is charged to the 0.375 inch I.D. cylinder which is held at 380° C.±0.5° C., allowed to come to an equilibrium temperature during 5 minutes, and extruded through the 0.0825 inch diameter, 0.315 inch long orifice under a piston loading of 5000 grams. The specific melt viscosity in poises is calculated as 53,150 divided by the observed extrusion rate in grams per minute.

The term "specific I.R. ratio" as used herein refers to the net absorbance in the infra-red at a wave length of 10.18 microns divided by the net absorbance in the infra-red at a wave length of 4.25 microns, of a film about 2 mils thick obtained by melting, pressing and water quenching a sample of the resin. The values herein referred to are determined on film prepared by melting a 0.5 gram sample of the resin at 340° C., pressing the melted sample during one minute at 340° C. under 40,000 pounds force between the shiny sides of 5″ square aluminum sheets having a combined thickness of 3 mils in a 6″ square, 5 mil deep cavity of a mold assembly consisting of superposed flat platens separated by a centrally apertured spacer sheet, quenching the mold assembly in ice water, and dissolving the adherent aluminum foil away from the resulting film in hot (90–100° C.) aqueous, 10 percent sodium hydroxide solution. A clear portion of the film is mounted on the sample holder of a recording infra-red spectrometer, and scanned in the ranges of from 3.5 to 5 microns and from 9.5 to 12 microns while flushing the sample holder with nitrogen. The net absorbances at 10.18 and 4.25 microns are measured in the conventional way. From correlations with material balances during resin synthesis and analyses of the products of controlled resin decompositions, it has been indicated that the specific I.R. ratio when multiplied by 4.5 is numerically equal to the weight percent of combined hexafluoropropylene contained in the resin.

The term "specific volatile content" as used herein refers to the percentage of the weight of the dried resin lost when it is heated at 380° C. under ca. 10 mm./Hg absolute pressure for 30 minutes with removal of volatiles. The values herein referred to are determined by weighing a 2 to 5 gram sample of finely divided dried resin into a tared aluminum cup, placing the cup and contents into a glass vial, evacuating the vial, and inserting it in a cavity in a metal block heated to 380° C. The pressure within the vial is held at about 10 mm./Hg absolute and the block temperature at 380° C. during 30 minutes, after which the aluminum cup and contents are cooled to room temperature and reweighed.

The crystalline melting points referred to herein are the lowest equilibrium temperatures at which the X-ray patterns characteristic of crystalline structure disappear.

The products of the present invention may be fabricated at rates of 3.5 pounds per hour or more into smooth continuous films 4″ wide and 0.005″ thick, having a MIT flex life of more than 1000 cycles (i.e., a value as measured by repeated flexing through an angle of 300° under a tensile stress of 1500 p.s.i. at 23° C. on a Tinius-Olson Folding Endurance Tester of the type developed at the Massachusetts Institute of Technology) and a standard short time dielectric break-down strength uniformity above 500 volts per mil (i.e., a value as measured in Primol D hydrocarbon oil via ASTM D-149-44), by extruding them in a molten state at 380° C. from a reservoir through a restricted 6″ x 0.050″ rectangular orifice and then drawing and cooling the extrudate. The foregoing specifications represent the practical minima which must be met by hexafluoropropylene/tetrafluoroethylene interpolymers in order to justify the cost of fabricating them by melt extrusion in preference to other fabrication techniques, while at the same time producing articles of commercially acceptable toughness and homogeneity.

In specific embodiments, the products of the present invention may be melt extruded and drawn according to the above specifications at rates as high as 125 pounds per hour or more to yield smooth, continuous 4″ x 0.005″ films having a flex life of up to an order of $10^6$ cycles, and a short time dielectric break down strength uniformly as high as 1500 to 2800 volts per mil or more.

The resins of the present invention may be made by a process which broadly comprises interpolymerizing hexafluoropropylene with tetrafluoroethylene in the presence of a free radical polymerization initiator while carefully regulating the monomer proportions and the initiator concentration to produce a suitable intermediate interpolymeric composition, followed by separating the intermediate and heating it in the molten state with removal of volatiles to obtain as a residue a final product of the desired characteristics.

The interpolymerization may be conveniently carried out at 50 to 150° C. and 20 to 70 atmospheres during 10 to 180 minutes in the presence of an aqueous solution of inorganic free radical initiator while maintaining the monomers present in hexafluoropropylene/tetrafluoroethylene weight ratio averaging in the range of from 3/7 to 9/1, and the initiator present at a concentration effective to generate active free radicals at a rate averaging in the range of from $4 \times 10^{-3}$ to $3 \times 10^{-6}$ moles per minute per liter of solution under the reaction conditions.

The intermediate interpolymeric composition may be conveniently separated from the resulting reaction mixture, after venting unreacted monomers, by coagulating the residual aqueous dispersion, filtering off and washing the coagulated solids, and drying the wet, washed product in the solid state.

The heating of the separated intermediate composition in the molten state with removal of volatiles may be conveniently carried out in air at 300° C. to 400° C. for a period of from 0.15 to 30 hours.

In preferred embodiments, the products of the present invention may be made by a process which comprises maintaining a gaseous mixture of from 50 to 90 weight percent hexafluoropropylene and from 10 to 50 weight percent, complementally, of tetrafluoroethylene under a pressure of 30 to 50 atmospheres in contact with a vigorously agitated aqueous solution of an inorganic free radical initiator generating active free radicals at the rate of from $1 \times 10^{-5}$ to $3 \times 10^{-5}$ moles per minute per liter of solution at a temperature of 90 to 100° C. for a period of 60 to 120 minutes; venting the unreacted monomers and coagulating the residual dispersion by violent stirring, filtering off and washing the coagulated solids with water, and drying the washed solids in air at 150° C. for 16 hours; and heating the dried product at a temperature of 350 to 400° C. in air for a time such that the common logarithm of the heating time in hours is at least equal to $(8.6227 - 0.0235\ T)$, where $T$ is the temperature of heating in degrees C.

In general, other conditions being the same, preparation of final products of high specific I.R. ratio is favored by increasing the proportion of hexafluoropropylene in the monomer mixture, while preparation of final products of low specific melt viscosity is favored by increasing the initiator concentration. However, the procedure is highly sensitive in that the characteristics of a series of products produced under conditions which are apparently the same may vary markedly due to the presence of adventitious trace quantities of telogen, metal, initiator or other interfering substance, or to small variations in the concentration of hexafluoropropylene in the monomer mixture. It is accordingly difficult to produce a final product having precisely the desired combination of characteristics in a single run.

Nevertheless, the blending, by intimate admixing and melting together of a plurality of separately produced products, results in a composite material manifesting values of specific I.R. ratio and specific volatile content which are to a close approximation additive functions of the corresponding properties of the components, and a specific melt viscosity, the common logarithm of which is to a close approximation an additive function of the common logarithms of the specific melt viscosities of the components. Accordingly, final products having a particular desired combination of properties may be readily obtained by varying polymerization conditions of the process as necessary to obtain products having properties which bracket those desired, and blending such products in suitable proportions. In blending, the admixing step is preferably carried out before heat treating in the molten state, so that comminution to admix thoroughly may be avoided. Thus, it is preferable to admix as components either the aqueous dispersions from the polymerization reaction, or the wet or dried particulate products recovered from the dispersions, after preliminarily carrying samples of each component through the full preparative procedure in order to determine their individual final characteristics.

The invention is more specifically described and explained by means of the following examples which, however, are not intended to be limiting. In the examples all parts and percentages are by weight except as otherwise noted.

*Example I*

A cylindrical horizontally disposed, water-jacketed, paddle-stirred, stainless steel reactor, having a length to diameter ratio of about 10 and a water capacity of 36.34 parts, is evacuated, charged with 22.68 parts of demineralized water and purged of gases by warming the charge and evacuating the reactor free space. The degasified charge is heated to 95° C., pressured to 250 p.s.i.g. with deoxygenated hexafluoropropylene, made $4.39 \times 10^{-4}$ molal with respect to ammonium persulfate by rapid addition of freshly prepared 0.1 molal solution of ammonium persulfate in demineralized water, and then stirred for 15 minutes at 95° C. At the end of the 15 minutes the reactor is pressured to 650 p.s.i.g. with a deoxygenated mixture of 25 percent hexafluoropropylene and 75 percent tetrafluoroethylene, and simultaneously injection into the reaction of freshly prepared 0.0052 molal solution of ammonium persulfate is commenced at the rate of 0.0455 part per minute, so that the calculated concentration of undecomposed persulfate is held at $2.19 \times 10^{-4}$ molal, and the rate of generation of active free radicals is maintained at about $2.08 \times 10^{-5}$ moles per minute per liter of solution, assuming a decomposition rate of 4.75 percent per minute for ammonium persulfate at 95° C. The stirring of the reactor contents at 95° C. and the injection of the 0.0052 molal ammonium persulfate solution are continued until the pressure in the reactor begins to drop, and thereafter for 80 minutes during which time the pressure is maintained at 650 p.s.i.g. by further addition of deoxygenated mixture of 25 percent hexafluoropropylene and 75 percent tetrafluoroethylene. At the end of the 80 minutes the stirring is stopped, the vapor in the reactor is sampled, and then the reactor is vented and its residual contents discharged.

There is obtained an aqueous dispersion containing 4.6 parts of resinous polymeric product. The sample of vapor taken from the reactor at the end of the 80 minutes is immediately analyzed by infra-red techniques and found to contain 68 percent hexafluoropropylene.

The aqueous dispersion is coagulated by stirring to obtain a particulate coagulum which is then filtered from the liquid, washed with distilled water and dried. The resulting powder is spread on aluminum trays to a depth of about 2 inches and heated in an air oven for 3 hours at 350° C. There is obtained a white, polymeric mass having a crystalline melting point of about 280° C., a specific melt viscosity of $7 \times 10^4$ poises, a specific I.R. ratio of 3.4, and a specific volatile content of 0.14 percent. The product is especially suitable for melt extrusion into thin, tough, homogeneous, continuous shaped articles.

A sample of the polymeric mass is chopped into small pieces and charged to a screw-fed melt extrusion apparatus lined with corrosion-resistant metal and comprising a 2″ I.D., 30″ long barrel, a closely fitting screw of the sudden-compression type, a die adapter, and a downwardly discharging die having a 6″ x 0.050″ rectangular orifice of 0.5″ land length. The apparatus is electrically heated to maintain temperatures of 260° C. at the rear of the barrel, 330° C. at the middle of the barrel, and 380° C. at the die, adapter, and forward part of the barrel. The sample is melt extruded through the die at the rate of 35 pounds per hour to yield a smooth continuous extrudate which is passed downwardly through a ¾″ air gap into a water quench bath, thence under the over rollers to power-driven pinch rolls by means of which the extrudate is drawn, between the die and the quench bath, to yield a 4″ wide, 0.005″ thick film, which issues from the pinch rolls at the rate of about 30 feet per minute. The film thus produced has an MIT flex life of 4500 cycles, and a standard short time dielectric break down strength uniformly above 1500 volts per mil.

In a similar manner the polymer is extruded as a tube and hot-drawn at 10/1 draw ratio to form 10 mil thick insulation on 30 mil wire at the rate of 400 feet per minute; the product passes specifications for high temperature hook-up wire for electronic applications.

A sample of the polymer is charged to a press spinner having a ⅞″ barrel with heaters on the barrel and a spinneret adapter on the base of the barrel. A one hole, 12 mil, tapered-entrance hat-type spinneret is used. The polymer is heated to 400° C., and fiber extruded by means of a close fitting piston in the barrel, at the rate of about 2 pounds per hour. The fiber is wound up at a speed of 88 yards per minute. The pressure required for extrusion is 100 pounds per square inch. A sample of the spun fiber is drawn 5× at 125° C., and has the following properties: tenacity 0.58 g.p.d.; elongation, 27%; initial modulus 8.2 g.p.d.; denier 344.

In other tests the polymer is melt extruded at 380° C. at the rate of 22 pounds per hour through a 0.25″ diameter circular orifice of 0.5″ land length to form tough, homogeneous beading and drawn to tough, strong, homogeneous filaments; it is melt extruded at 380° C. through a tubing die at the rate of 5 feet per minute to form tough, homogeneous, 0.5″ x 0.625″ x 0.050″ tubing, capable of being bent 90° without buckling; it is injection molded into the molten state at 380° C. through restricted orifices at shear rates of up to 100 reciprocal seconds to form tough, homogeneous shaped articles. Suitable corrosion resistant materials for fabrication apparatus include Duranickel nickel-manganese-aluminum alloy, "Ampco" aluminum bronze alloy, and, in general, the high nickel and high chromium steels. Fabrication temperatures up to about 400° may be employed without objectionable degradation of the polymer.

*Example II*

The procedure of Example I is repeated except that the liquid charge is initially made $3.81 \times 10^{-4}$ molal with respect to potassium persulfate by rapid injection of 0.0236 molal potassium persulfate; the reactor is initially pressured to 440 p.s.i.g. with deoxygenated hexafluoropropylene; after 15 minutes injection of 0.0088 molal potassium persulfate is commenced at the rate of 0.0168 parts per minute so that the concentration of undecomposed potassium persulfate is held at $2.59 \times 10^{-4}$ molal and the rate of generation of active free radicals at $1.25 \times 10^{-5}$ moles per minute per liter of solution, assuming a decomposition rate of 2.6 percent per minute for potassium persulfate at 95° C.; and the pressuring to 650 p.s.i.g. and thereafter maintaining at 650 p.s.i.g. is accomplished with deoxygenated tetrafluoroethylene alone. In this run the concentration of hexafluoropropylene in the reactor free space at the end of the 80 minutes is 69.6 percent, and there is obtained an aqueous dispersion containing 3.04 parts of resinous material. After the washing, drying and heat treating of the resinous material, there is obtained a white polymeric mass having a crystalline melting point of 272° C., a specific melt viscosity of $6.1 \times 10^4$ poises, a specific I.R. ratio of 3.66 and a specific volatile content less than 0.15 percent.

The product is cut into small pieces and extruded by the procedure of Example I at the rate of 41 pounds per hour into 4″ x 0.005″ film having an MIT flex life of 5600 cycles and a standard short-time dielectric break down strength uniformly above 1000 volts mil.

*Example III*

The procedure of Example II is repeated except the reactor is initially pressured to 480 p.s.i.g. with deoxygenated hexafluoropropylene; the concentration of hexafluoropropylene in the reactor at the end of the 80 minutes is 73.6 percent, and 3.99 parts of resinous product is obtained. After the separating, washing, drying and heat treating of the resinous product there is obtained a white polymeric mass having a crystalline melting point of 261° C., a specific melt viscosity of $4.4 \times 10^4$ poises, a specific I.R. ratio of 4.70, and a specific volatile content of less than 0.15 percent. The product is cut into small pieces and extruded by the procedure of Example I at the rate of 56 pounds per hour into 4″ x 0.005″ film having an MIT flex life of 20,500 cycles and a standard shorttime dielectric strength uniformly above 1000 volts per mil. The product is especially suitable for injection molding at shear rates of up to 170 to 180 reciprocal seconds.

*Example IV*

The procedure of Example II is repeated except that the charge is initially made $4.39 \times 10^{-4}$ molal by rapid injection of 0.0236 molal potassium persulfate; after 15 minutes the calculated rate of generation of active free radicals is maintained at $1.5 \times 10^{-5}$ moles per minute per liter of solution by continuous injection of 0.0104 molal potassium persulfate; the vapor sampled at the end of the 80 minutes contains 66.1 percent hexafluoropropylene, and 4.17 parts of resinous product is obtained. After the separating, washing, drying and heat treating of the resinous product, there is obtained a white polymeric mass having a crystalline melting point of 279° C., a specific melt viscosity of $2 \times 10^5$ poises, a specific I.R. ratio of 3.41, and a specific volatile content of less than 0.15 percent. The product is cut into small pieces and extruded by the procedure of Example I at the rate of 6 pounds per hour into 4″×0.005″ film having an MIT flex life of 30,000 cycles and a standard short time dielectric strength uniformly above 1000 volts per mil.

*Example V*

The procedure of Example II is repeated except that the charge is initially made $4.12 \times 10^{-4}$ molal by rapid injection of 0.0236 molal potassium persulfate and pressured to 450 p.s.i.g. with deoxygenated hexafluoropropylene; after the 15 minutes the calculated rate of generation of active free radicals is maintained at $1.45 \times 10^{-5}$ moles per minute per liter of solution by continuous injection of 0.0098 molal potassium persulfate; the vapor sampled at the end of the run contains 69.5 percent hexafluoropropylene, and 2.1 parts of resinous product is obtained. After washing, drying and heat treating the resinous product there is obtained a polymeric mass having a crystalline melting point of 265° C., a specific melt viscosity of $1.2 \times 10^4$ poises, a specific I.R. ratio of 4.41, and a specific volatile content of less than 0.25 percent. The product is cut into small pieces and extruded by the procedure of Example I at the rate of 120 pounds per hour into 4″ x 0.005″ film having an MIT flex life of 1800 cycles and a standard short time dielectric strength uniformly above 1000 volts per mil.

*Example VI*

The polymerization procedure of Example II is repeated, except that the proportion of hexafluoropropylene in the charge is reduced so that the vapor in the reactor free space at the end of the run contains 58 percent hexafluoropropylene. The resinous product is separated, washed and dried by the procedure of Example I to give a particulate product hereinafter referred to as "product A." A sample of product A after heat treating by the procedure of Example I has a specific melt viscosity of $4.2 \times 10^4$ poises, a specific I.R. ratio of 2.58, a crystalline melting point of 290° C. and a specific volatile content of less than 0.15 percent.

The polymerization procedure of Example IV is repeated, except that the reaction is continued for 120 minutes instead of 80. The resinous product is separated, washed and dried by the procedure of Example I to give a particulate product hereinafter referred to as "product B." A sample of product B after heat treating by the procedure of Example I has a specific melt viscosity of $16.6 \times 10^4$ poises, a specific I.R. ratio of 4.13, a crystalline melting point of 268° C., and a specific volatile content of less than 0.15 percent.

A blend of equal parts of products A and B is prepared by tumbling the ingredients together in a closed container for about 15 hours, and subjecting the resulting mixture to heat treating by the procedure of Example I. There is obtained a white polymeric product having a specific melt viscosity of $9.2 \times 10^4$ poises, a specific I.R. ratio of 3.34, a crystalline melting point of 280° C., and a specific volatile content of less than 0.15 percent. The resulting heat treated blend is melt extruded at 380° C. by the procedure of Example I at the rate of 27 pounds per hour into 4" x 0.005" film having an MIT flex life of 7600 cycles and a standard short time dielectric break down strength uniformly above 1000 volts per mil.

A blend of products A and B in 1/3 weight ratio, prepared by the foregoing procedure, has a specific melt viscosity of $11.5 \times 10^4$ poises, a specific I.R. ratio of 3.78, a crystalline melting point of 274° C., and a specific volatile content of less than 0.15 percent. The blend is melt extruded at 380° C. by the procedure of Example I at the rate of 20 pounds per hour into 4" x 0.005" film having an MIT flex life of 13,000 cycles and a standard short time dielectric break down strength uniformly above 1000 volts per mil.

*Example VII*

A reactor similar to that of Example I but having a water capacity of 568 parts is evacuated and charged with a freshly prepared solution of 0.563 parts of "soluble ferric phosphate," which is a mixture of $FePO_4$ and sodium citrate containing 12 to 15 percent of combined iron, and 0.0529 parts of sodium bisulfite in 424 parts of hot deoxygenated demineralized water. The free space above the charge is evacuated, and the charge stirred and heated at 93.5° C. during 5 minutes. Stirring is stopped and the reactor pressured to 400 p.s.i.g. with a mixture of hexafluoropropylene and tetrafluoroethylene in 3 to 7 weight ratio during about 10 minutes, after which agitation is resumed. Reaction as evidenced by pressure drop commences immediately with resumption of stirring. The rate of generation of active free radicals at the commencement of reaction is about $7.8 \times 10^{-6}$ moles per minute per liter of solution, using an empirical rate equation $r = 9.17 \times 10^{-3} (A)(B)(C)^{-1.1}$ where $r$ is the rate, A is the bisulfite concentration, B the ferric iron concentration, and C the citrate concentration. Thereafter the reaction is continued for 120 minutes with agitation while maintaining the temperature at 93.5° C. and the pressure at 400 p.s.i.g. by further addition of hexafluoropropylene and tetrafluoroethylene in 3 to 7 weight ratio admixture. At the end of this period, the calculated rate of generation of active free radicals is about $2.32 \times 10^{-8}$ moles per mintue per liter of solution. The agitation, pressuring and heating is then stopped, the unreacted monomers vented, and the residual reactor contents cooled to about 60° C. and discharged. There is obtained an acidic aqueous colloidal dispersion containing about 8 percent solids.

The above procedure is repeated except that the temperature is maintained at 100° C. and the duration of the reaction is 80 minutes, the calculated rate of generation of free radicals being about 60 percent greater at 100° C. than at 93.5° C. There is obtained an acidic aqueous dispersion containing about 6 percent solids.

The two dispersions are treated with commercial cation exchange resin to remove contaminating iron. A mixture of equal volumes of the demineralized dispersions is then coagulated with violent stirring, washed with water, and dried 16 hours at 140° C. in an air oven.

The resulting product is heated in an air oven for 15 minutes at 380° C. There is obtained a resinous product having a specific melt viscosity of $2.63 \times 10^5$ poises, a specific I.R. ratio of 1.95, and a specific volatile content of 0.25 percent. The heat-treated product, cut into small pieces and extruded at a rate of 3.5 pounds per hour by the procedure of Example I, yields a 4" x 0.005" smooth continuous film having an MIT flex life of 1500 cycles, and a short time dielectric breakdown strength uniformly above 500 volts per mil.

The criticality of the limitations hereinbefore set forth with respect to the products of the present invention have been established as the result of numerous experiments and tests which show: (a) that compositions of resinous interpolymeric hexafluoropropylene and tetrafluoroethylene having a specific melt viscosity which is greater than $3 \times 10^5$ poises yield rough, kinked or broken extrudates when it is attempted to fabricate them at practical rates via conventional melt extrusion techniques, as for example, at a rate of 3.5 pounds per hour or more by the procedure of Example I for the production of 5 mil thick film; (b) that compositions of resinous interpolymeric hexafluoropropylene and tetrafluoroethylene having a specific melt viscosity in the range of $1.5 \times 10^3$ to $3 \times 10^5$ poises and a specific I.R. ratio which is less than 12.26 minus (1.96 times the common logarithm of the specific melt viscosity), when fabricated, yield products which are too brittle for commercial use, such as for example, 5 mil thick films having an MIT flex life of less than 1000 cycles, while compositions having a specific I.R. ratio of greater than 6 are extremely difficult to prepare; and (c) that compositions of interpolymeric hexafluoropropylene and tetrafluoroethylene having a specific melt viscosity in the range of $1.5 \times 10^3$ to $3 \times 10^5$ and a specific I.R. ratio in the range of 1.5 to 6 which is at least equal to 12.26 minus (1.96 times the common logarithm of the specific melt viscosity), as separated from their parent reaction mixtures, contain material volatile under melt extrusion conditions, as manifested by a specific volatile content of greater than 0.3 percent, and ordinarily 0.6 percent or more, by reason whereof their melt extrusion yields bubbled, non-homogeneous, extrudates which are unsuitable for most practical uses.

In general, the useful properties of the products of the present invention, in respects other than specific melt viscosity, specific I.R. ratio and crystalline melting point, approximate or exceed the corresponding properties of commercial polytetrafluoroethylene resins, and may be used in similar applications wherever somewhat lower service temperatures are permissible. They may thus be used to take advantage of the excellent chemical inertness, electrical properties, anti-friction properties, weather resisting properties, temperature-resisting properties, and the like. They may be pigmented, filled and reinforced by conventional procedures. In addition, in thin sections they manifest a high degree of transparency, and may be biaxially oriented for added strength. At temperatures above 350° C. they develop adhesive bonds of excellent strength with glass, metals, and other materials capable of withstanding fabrication temperature in finely divided, fibrous, porous or massive form. They are thus suitable for laminating. They may also be bonded to thermally unstable substrates by flash heating and quench cooling techniques.

We claim:

1. As a new perfluorocarbon product, resinous interpolymeric hexafluoropropylene and tetrafluoroethylene, having a specific melt viscosity, as measured at 380° C. under a shear stress of 6.5 pounds per square inch, of $1.5 \times 10^3$ to $3 \times 10^5$ poises, a specific I.R. ratio, as measured on film of about 2 mil thickness water-quenched from the molten product, by net absorbance at 10.18 microns wave length divided by net absorbance at 4.25 microns wave length, in the range of 1.5 to 6, which ratio is at least equal to the difference between 12.26 and the product of 1.96 and the common logarithm of the said specific melt viscosity, and a specific volatile content, as measured by weight loss during 30 minutes at 380° C. under a pressure of 10 mm./Hg absolute, of less than 0.3 percent.

2. The product of claim 1 in film form.

3. The product of claim 1 in filament form.

4. The product of claim 1 in tubular form.

5. As a new perfluorocarbon product, resinous interpolymeric hexafluoropropylene and tetrafluoroethylene having a specific melt viscosity, as measured at 380° C. under a shear stress of 6.5 pounds per square inch, of $3 \times 10^4$ to $1 \times 10^5$ poises, a specific I.R. ratio, as measured on film of about 2 mil thickness water-quenched from the molten product, by net absorbance at 10.18 microns wave length divided by net absorbance at 4.25 microns wave length, in the range of 2.77 to 5, which ratio is at least equal to the difference between 12.585 and the product of 1.963 and the common logarithm of the said specific melt viscosity, and a specific volatile content, as measured by weight loss during 30 minutes at 380° C. under a pressure of 10 mm./Hg absolute, of less than 0.2 percent.

6. The product of claim 5 in the form of a melt extruded article.

7. The product of claim 5 in the form of an injection molded article.

8. A process for the preparation of a resinous perfluorocarbon product suitable for fabrication by melt extrusion which comprises heating in the molten state with removal of volatiles a resinous intermediate perfluorocarbon product comprising interpolymerized hexafluoropropylene and tetrafluoroethylene, said intermediate product having a specific melt viscosity of less than $3 \times 10^5$ poises as measured at 380° C. under a shear stress of 6.5 pounds per square inch, a specific I.R. ratio, as measured on film of about 2 mil thickness water-quenched from said intermediate product in the molten state, by net absorbance at 10.18 microns wave length divided by net absorbance at 4.25 microns wave length in the range of 1.5 to 6, and a specific volatile content as measured by weight loss at 380° C. under a pressure of 10 mm./Hg absolute, of greater than 0.3 percent, and continuing said heating until there is obtained a final product in which the said specific volatile content is less than 0.3 percent, the said specific I.R. ratio is in the range of 1.5 to 6, and the said specific melt viscosity is in the range of $1.5 \times 10^3$ to $3 \times 10^5$ poises, and has as its common logarithm a number which is at least equal to the quotient from dividing by 1.96 the difference between 12.26 and the said specific I.R. ratio of said final product.

9. A process according to claim 8 wherein the said heating in the molten state with removal of volatiles is carried out in air at 300 to 400° C. for from 0.15 to 30 hours.

10. A process according to claim 8 wherein said intermediate resinous product is prepared by blending a plurality of resinous interpolymeric hexafluoropropylene and tetrafluoroethylene products, at least one of which has a said specific I.R. ratio of greater than 1.5, at least one of which has a said specific melt viscosity of less than $3 \times 10^5$ poises, and at least one of which has a said specific volatile content of greater than 0.3.

11. A process according to claim 8 wherein said intermediate resinous product is prepared by interpolymerizing hexafluoropropylene and tetrafluoroethylene at a temperature of 50 to 150° C. under a pressure of 20 to 70 atmospheres during 10 to 180 minutes in the presence of an aqueous solution of a free radical polymerization initiator, while maintaining, during the course of the interpolymerizing, the monomers present in hexafluoropropylene to tetrafluoroethylene weight ratio averaging in the range of 3/7 to 9/1 and the initiator present at a concentration effective to generate active free radicals at a rate averaging in the range of $3 \times 10^{-3}$ to $3 \times 10^{-6}$ moles per minute per liter of said solution.

12. A process according to claim 11 wherein said interpolymerization is carried out at 90 to 100° C. and 30 to 50 atmospheres during 60 to 120 minutes in the presence of an inorganic persulfate initiator, the said monomer weight ratio being at least 1/1 and the said concentration of initiator being effective to generate active free radicals at a rate in the range of $1 \times 10^{-5}$ to $3 \times 10^{-5}$ moles per minute per liter of said solution.

13. A process according to claim 12 wherein said heating in the molten state with removal of volatiles is carried out for a time such that the common logarithm of the heating time in hours is at least equal to the difference between 8.6227 and the product of 0.0235 and the temperature of said heating in degrees centigrade.

References Cited in the file of this patent

UNITED STATES PATENTS

| | | |
|---|---|---|
| 2,392,389 | Joyce | Jan. 8, 1946 |
| 2,468,664 | Hanford et al. | Apr. 26, 1949 |
| 2,549,935 | Sauer | Apr. 24, 1951 |